April 13, 1943.　　F. KESSELRING ET AL　　2,316,170
APPARATUS FOR INTERRUPTING OR CONTROLLING ELECTRIC CURRENTS
Filed Dec. 30, 1938　　5 Sheets-Sheet 3
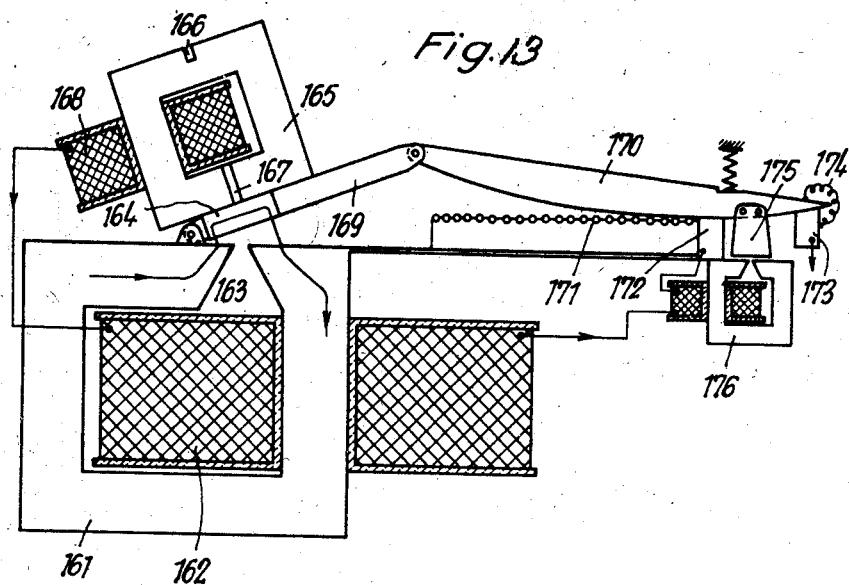
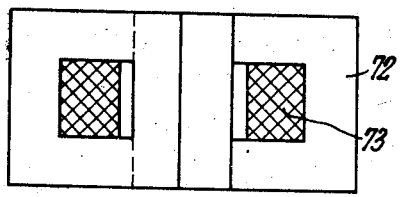
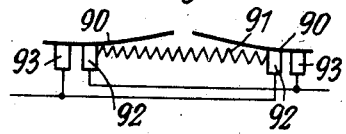
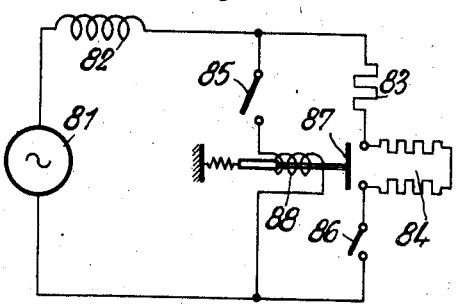

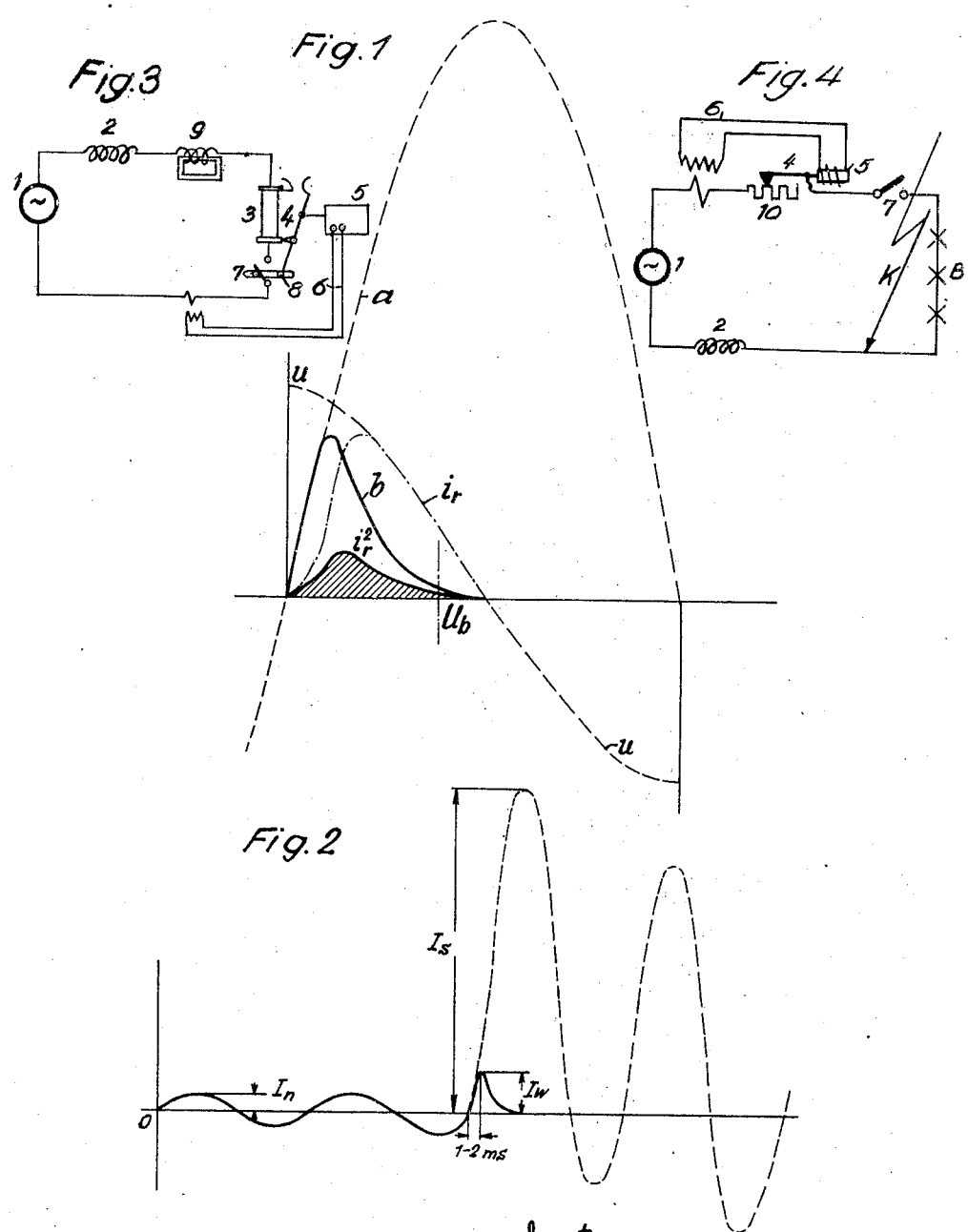

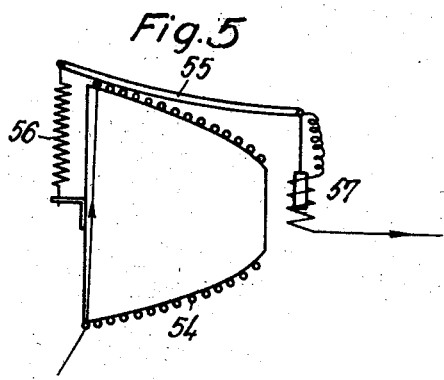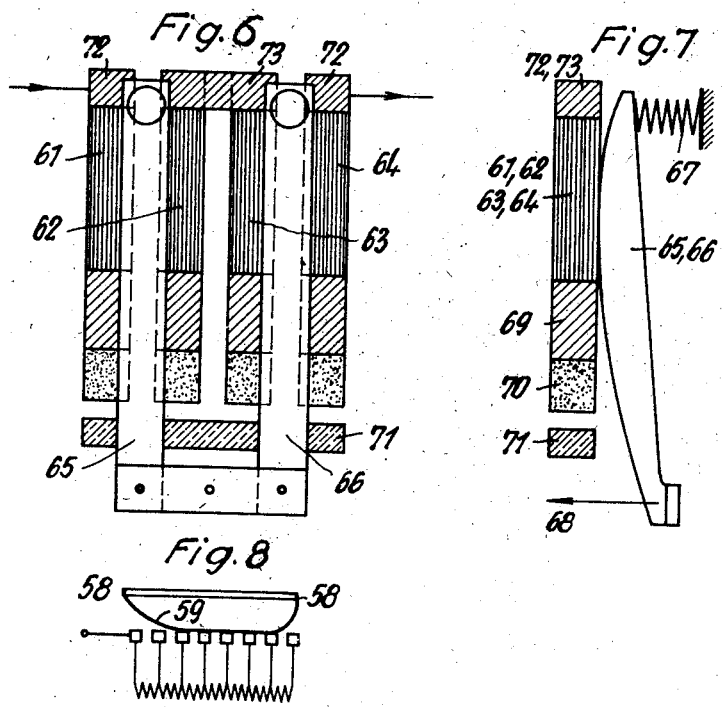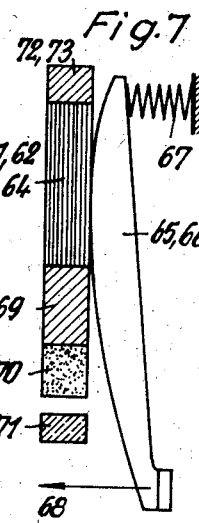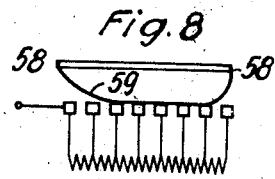

Patented Apr. 13, 1943

2,316,170

UNITED STATES PATENT OFFICE 2,316,170

APPARATUS FOR INTERRUPTING OR CONTROLLING ELECTRIC CURRENTS

Fritz Kesselring, Friedrich Gieffers, Werner Kaufmann, Hermann Neugebauer, Wilhelm Puttfarcken, Robert Schimpf, and Marcel Zühlke, Berlin, Germany; vested in the Alien Property Custodian Application December 30, 1938, Serial No. 248,648
In Germany December 31, 1937

37 Claims. (Cl. 175—294)

The invention relates to methods and means for interrupting electric currents, particularly alternating currents of high intensity in high and low tension circuits, substantially without arcing or sparking, or for regulating such currents within wide limits.

It has been suggested to reduce the arcing of circuit breakers by connecting resistances into the circuit before effecting the interruption proper; but this method caused just as many difficulties as the direct interruption of high power circuits. Therefore the arc switch has always been considered the simplest means for breaking a circuit. The difficulties of inserting resistances consisted in that (1) Very large dimensions of the resistance were necessary to absorb the amount of energy corresponding to the high current or to conduct the same without undue heating, and that (2) High voltages occurred which rendered the use of the resistance difficult since they caused puncturing and flashing-over of the resistance body.

Although the processes known prior to the invention for switching resistances into the circuit possibly caused a quicker decreasing of the excess or transient current, they did practically not affect the current maximum which immediately follows the beginning of the switching operation. This initial maximum, however, causes the difficulties mentioned above. The recognition and study of this phenomenon and the objective to eliminate the above-mentioned difficulties form a basis of the present invention.

According to the invention, substantially ohmic resistance means are inserted into the circuit as a first step of an interrupting or regulating operation and in such manner or with the aid of such means that the effective resistance value changes from a low initial magnitude to a considerably higher magnitude with a speed and within a period as specified in the following. The speed of change, according to the invention, is of such magnitude that the first current maximum occurring immediately after the switching-in of the resistance means has started, is considerably lower than it would be without the switching-in of the resistance means. This means that the resistance must become effective within an extremely short time. With periodically varying currents such as alternating currents, this time is limited to the duration of a half wave, i. e. for instance to $\frac{1}{100}$ of a second. Generally, however, the time should be kept much shorter. In the case of alternating currents, the switching-in of the resistance means is preferably effected by a synchronous timing or control device at or near the zero value of the alternating current wave, preferably shortly before this zero passage. The switching-in of the resistance means is, as a rule, initiated in dependence upon the occurrence of a considerable change or irregularity of the electrical condition of the circuit to be interrupted or in response to a change of the switching arrangement to a condition of lower loading capacity. The tripping and actuating devices of the known switches with protective resistances do not satisfy the above-mentioned requirements of the invention as regards the speed of operation and the rate of change of the instantaneous resistance value. Upon opening of the contacts bridging the resistance of the known switches an arc is always drawn so that the drop in voltage thereon increases from its normal value of, for example, 10 to 100 millivolts, to the voltage of the arc of 10 to 100 volts, i. e. approximately thousand times (beginning of the change in condition of the circuit). The arc cannot be extinguished before the next zero value. With the known switches, however, it is entirely left to chance whether the arc is extinguished already at the next zero point. Generally, several half-periods pass before the arc ceases to bridge the protective resistance and before the latter becomes effective. The maximum value of the current to be interrupted therefore remains immediately after the beginning of the change in condition of the circuit the same as with a switch without resistance. In contrast thereto, the present invention makes it possible to reduce the current to a fraction of the maximum value otherwise to be expected already within the time usually required from the beginning of the switching operation to the first attainment of this maximum value.

It is another object of the invention to reduce the resistance means necessary for the above-explained operation to relatively small dimensions. This is made possible by the fact that the energy absorbed by the resistance can be kept very small, provided the latter is made of the proper size, because of the short duration of the switching operation and the favorable point of time of the switching-in. On the other hand, considerable voltages on the resistance which would render the switching-in of the resistance difficult, are avoided because at the moment of switching-in, the voltage lies totally or almost totally on the inductive resistances of the circuit and, upon proper selection of the resistance value, the voltage on the resistance rises only gradually even after the switching-in operation.

Further objects and features of the invention will be discussed in connection with the drawings which show the following:

Figs. 1 and 2 are of explanatory nature and show current and voltage characteristics as occurring when interrupting a circuit in accordance with the present invention.

Figs. 3 and 4 illustrate in diagrammatic form two different embodiments of arrangements according to the invention.

Fig. 5 represents a further form of variable switching resistor having a rocking member for effecting the desired resistance variations.

Figs. 6 and 7 are a top view and a side elevation, respectively, of a modified construction of such rocker-type resistance.

Fig. 8 presents in diagrammatic form two further possibilities of constructing rocking elements for variable resistances of the type shown in Figs. 5, 6 and 7.

Fig. 9 illustrates a switching arrangement according to the invention, in which several interconnected switching resistances are consecutively brought into operation in order to effect the desired reduction of the current intensity previous to the interruption of the current.

Figs. 10 and 11 show a sectional side elevation and a top view, respectively, of electromagnetic drive means capable of actuating a plurality of cooperative resistance systems.

Fig. 12 shows diagrammatically different details and modifications of swiftly moving or rolling contact elements and of resistance units to cooperate therewith.

Fig. 13 serves to demonstrate magnetic means for operating the movable element of a variable resistance according to the invention, with the extremely great speed required.

Figure 14:
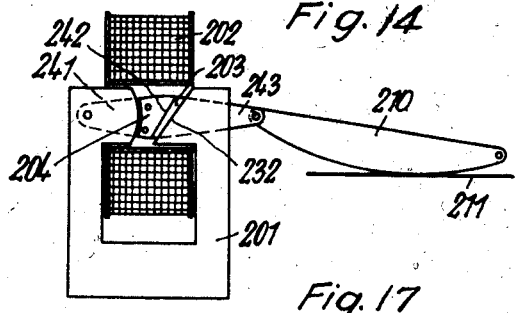
Figure 17:
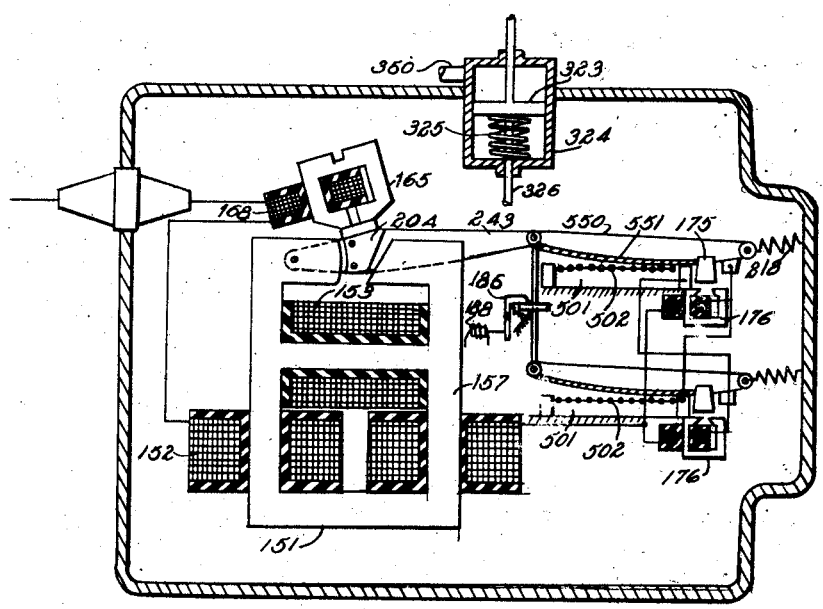
Figure 15:
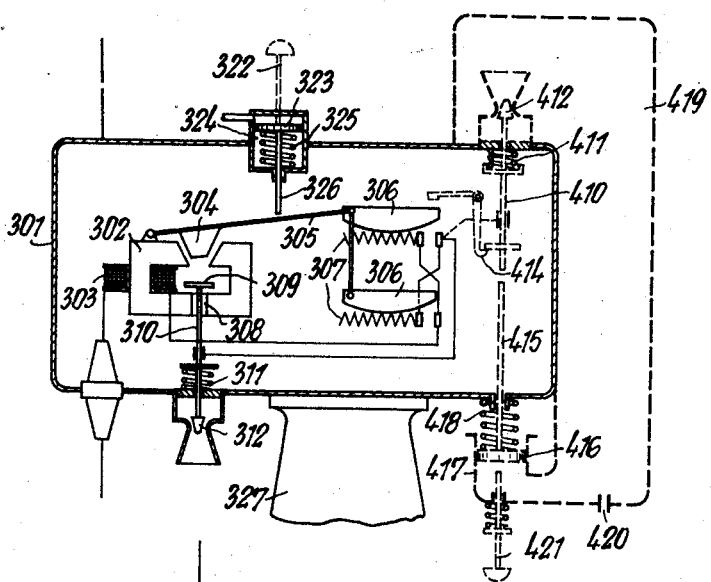
Figure 16:
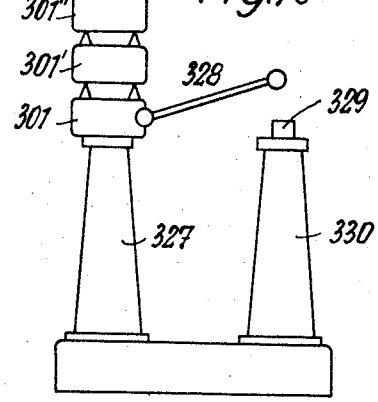

Fig. 14 represents a fourth modification of such drive magnet in combination with a rocking member to be actuated, and Figs. 15 and 16, finally, show diagrammatically two complete circuit breakers according to the invention and indicate the interrelationship of the elements and part-constructions illustrated in previous figures, while Fig. 17 is a side view of a complete assembly of units such as have been previously shown in detail.

The method and means according to the invention may now be elucidated on the basis of the explanatory diagrams in Figs. 1 and 2.

Fig. 1 exemplifies the proceedings upon breaking an inductively loaded alternating current circuit. In this figure, $u$ represents the voltage curve, $a$ the current curve lagging 90° behind the voltage curve, and $b$ the curve of the current flow. The current to be interrupted may be a normal or an overload current. If, according to the invention, the resistance is switched-in with sufficient speed, the current value is reduced to such extent that it proceeds according to curve $b$ instead of curve $a$. The duration of the half-wave at the usual alternating current frequency amounts to 10 milliseconds. Therefore, under the assumptions upon which Fig. 1 is based, the resistance must become effective already after 1 to 2 milliseconds. The maximum value of the current $b$ remains a fraction of the value to be otherwise expected according to curve $a$. At the time of the maximum of curve $a$ the current according to curve $b$ has reached a value which is several orders of magnitude smaller. The resistance of the circuit therefore must have increased accordingly. The ohmic value of the switched-in resistance according to the present example exceeds the circuit reactance and reaches a multiple thereof already during the rise of curve $a$ whereby the current and the voltage are practically in phase. The residual current may be interrupted or reduced to a very small amount by simple switching means.

Since the difficulties of switching-in of the resistance strongly increases with its original energy absorption, it is important that the latter is kept small for a certain length of time during which the switching-in must occur. Particularly that current is of importance with the square of which the energy increases. Since at a short circuit the current in alternating current circuits generally rises steeply after passing the zero value, it is advisable to provide in series with the resistance an additional inductance which, while having a low magnitude during the greater portion of the current cycle, increases its inductance value in the vicinity of the zero point to about the value of the other inductances present in the circuit. A saturable iron-cored choke coil may be used as such additional inductance. Such means have the effect that the current curve is flattened near the zero passage of the current cycle so that the resistance can be switched-in without difficulty during a certain length of time which is practically sufficient for this purpose.

Another procedure for obtaining favorable conditions for the switching-in consists in changing the effective value of the resistance means several orders of magnitude during the switching operation. For this purpose, an adjustable or automatically varying resistance is used, preferably of a material whose temperature coefficient of resistance is positive and increases continuously and gradually during the switching operation.

As such a resistance material Swedish charcoal iron (a very pure type of iron which is poor in carbon) or tungsten may be used; each of these has a very high temperature coefficient. If the variable resistance is switched-in with its smallest value and at or near the zero passage, and if then the resistance value is increased to its maximum value, a sufficiently small absorption of energy and a correspondingly small voltage in the vicinity of the zero point may be relied upon. Since, as mentioned, the change of resistance value occurs within a period equal to or less than the order of magnitude of a half wave of the current to be controlled, the power of the residual current to be interrupted is extremely small.

The interruption of the residual current in arrangements according to the invention, as a rule does not cause difficulty since as soon as the ohmic resistance is effective with its full value, the current and voltage are approximately in phase. The switching device for interrupting the residual current is preferably also opened shortly prior to the zero value of the current.

Arrangements according to the invention are especially advantageous as protection against overloads or excess voltages. In such cases, resistance means are preferably switched-in immediately at the beginning of the excess current or voltage. The result thus obtainable is elucidated by Fig. 2. This figure illustrates the course of an alternating current with an amplitude $I_n$. Due to the occurrence of a short-circuit, the current changes into the short-circuit current. The beginning rush current of the value $I_s$, by decreasing for example of a superposed direct current element, passes over to the sustained short-circuit current. According to the invention, the resistance means could now be switched-in near any desirable zero passage of the current wave, whereby the current would be dampened and placed in phase with the voltage because of the ohmic characteristic, so that after a quarter period it again passes through zero and could be easily interrupted. However, it is of great advantage that the resistance is switched-in or made effective immediately after the occurrence of the excess current. This results in the course indicated by a heavy line in Fig. 2, according to which the current (otherwise similar to Fig. 1) reaches an amplitude $I_w$ within a very short time, for example within 1 to 2 milliseconds or less, which amplitude is considerably smaller than that of the rush current which would otherwise occur. The conditions are particularly favorable if the time from the occurrence of the short-circuit current to the switching-in of a sufficiently large part of the resistance, amounts only to a fraction of the time within which the amplitude of the rush current would otherwise be obtained, that is, if the adjusting process occurs within the so-called "straight portion" of the rise of the curve. Because of the great speed with which the resistance is made effective, such arrangement may be used also for the interruption or regulation of direct currents. If direct current is used and an overload or a short circuit occurs, the course of the current as compared with the normal current value, is similar to the rise in the first quarter-period of the rush current with alternating current. This shows that also in the case of direct current, the amplitude of an overload current is considerably reduced and that then a further reduction occurs down to a very low value which may be easily interrupted if necessary.

According to another feature of the invention the first switching-in operation may be followed by a series of further switching-in operations of resistances which lie in series with the first resistance, in which case these switching operations are preferably performed shortly before or near the zero value of the current which has been reduced by the resistance.

The invention will be more readily understood from the following description of embodiments.

Fig. 3 illustrates in principle an interrupting arrangement with an unalterable or constant switching resistance. Numeral 1 indicates an alternating current generator, 2 are the inductive resistances present in the alternating current circuit. The interrupting mechanism consists of a resistance 3, a parallel contact 4, a synchronous switching device 5, and a series switch 7 which is mechanically controlled by the synchronous switch through the member 8 and serves for interrupting the residual current. The switching device 5 is influenced from the main circuit through the control circuit 6. The control impulse may be transmitted through a lagging device, for example, in order to decrease short-circuit currents prior to the switching, if they should not be acted upon while arising.

During normal or uninterrupted operation the parallel switch 4 and the switch 7 are closed. The resistance 3 is therefore bridged. At the occurrence of an excess current of a certain magnitude the synchronous switching device 5 receives the tripping impulse which is utilized in a known manner (for example, by means of two magnets, one of which is excited by the alternating current and the other by direct current) to open the locking mechanism of switch 4 in correct phase position so that the latter is opened in the vicinity of the zero value. Although the resistance 3 is switched into the circuit with its full value, the voltage on switch 4 is low because of the small current. The voltage at the moment of switching lies substantially on the inductance 2 of the circuit. The switch 4 can therefore be opened without appreciable arcing. The energy absorption of resistance 3 remains low since the resistance limits the current, as shown for example in Fig. 1. The interruption may occur at the moment $U_b$. If the resistance is smaller than assumed for Fig. 1, a further resistance may be switched-in at $U_b$ and the current may be interrupted one half-wave later. In the circuit illustrated the current is already so small at the moment $U_b$ that the interruption may be performed by means of the simple interrupting device 7 which is opened a corresponding amount of time later than switch 4 is opened by the same switching device. In Fig. 1, $ir$ indicates the voltage on the resistance, while the switching operation is indicated by the hatched area which is limited by the curve $i^2r$. It may readily be seen that this area may be kept very small if the proper kind of resistance is selected.

The requirements of the switch 4 may be further reduced for example by connecting a choke coil 9 with an iron core which is saturated at higher current values in series with the resistance 3. Hereby an extended low-current interval of the alternating current is produced.

Fig. 4 illustrates in principle the switching-in of a large resistance which for facilitating the switching-in is constructed as an adjustable resistance. The other drawings, beginning with Fig. 5, illustrate special embodiments of such an adjustable resistance in detail.

In Fig. 4 numeral 1 again indicates the alternating current generator, B the load, and 2 the inductive resistances of the circuit, while 10 is the adjustable resistance which may be constructed as a slide resistance, the slide contact of which is moved very quickly toward the other end of its contact path by the magnet 5 upon a short-circuit occurring at K. Since the resistance value is small at the beginning, the switching-in of the resistance may be performed without arcing and with small energy absorption, even if the switching is not started exactly at the zero point. The residual current is interrupted by the switch 7. As interrupting mechanism for the residual current, vacuum switches may be used with advantage. The switching mechanism for the residual current as shown in Fig. 3 or Fig. 4 may be coupled mechanically with the regulating or switching device for controlling the resistance, or may be controlled electrically. It is further possible to use another switching mechanism already present in the circuit, for example a remotely or synchronously controlled switch, for interrupting the residual current. The invention thus furnishes the possibility to utilize already existing switching mechanism far better and more efficiently.

The resistance means to be switched into the circuit and the contact or regulating mechanism for controlling the resistance means may be adapted to the requirements in various ways.

The resistance proper may be solid, semi-solid or fluid, a step-by-step resistance or a continuously and gradually changing resistance. A switching-in by steps may be combined with a continuous change of resistance within the steps. The initiation of the change of the resistance value may be effected automatically or manually. Temperature-responsive resistance materials may be mentioned as examples of automatically and gradually varying resistance means. The resistance variation may further be effected by deforming fluid, semi-solid (plastic), or solid-elastic resistance bodies. These different possibilities will now be elucidated by examples.

One embodiment of the invention in which the necessary high adjusting or regulating speed of the resistance can be easily obtained, utilizes rolling or rockerlike contacts for controlling the resistance as diagrammatically illustrated in Fig. 5. The resistance 54 consists of several non-inductively wound turns of a material having a high positive temperature coefficient, for example iron wire. The changing connection with the resistance is produced and controlled by a rolling or rockerlike lever 55 which is subjected on the one hand to the influence of a source of power 56 and on the other hand to the influence of a solenoid 57 through which the current also passes. Depending on the position of the rolling or rockerlike contact, different parts of the resistance are effective. By a corresponding dimensioning of the mass of the rolling or rocking lever and the attractive force of the solenoid, the entire resistance can be switched-in within 1 to 2 milliseconds. By the conical shape of the body carrying the resistance a different length of the individual resistance turns is obtained and thereby a gradation of the resistance which is very well adaptable to the adjusting or regulating operation. The resistance is so designed that between the individual turns such a small voltage per turn arises that the occurrence of an arc is safely avoided. If, for instance, such regulator is arranged in atmospheric air a voltage maximum per turn of slightly less than 10 volts is to be used. If desirable, a higher voltage per turn may be applied by placing the adjustable resistance in a medium, such as oil, pressure gas or a vacuum, of higher disruptive strength.

For this purpose it may be advisable to adapt the shape of the resistance body to the resistance characteristic or the gradation of the resistance, or, as advisable in many cases, to adapt the gradation to the shape of the body. The individual wires or turns of the resistance which are arranged small distances adjacent each other may be used as counter-contacts to cooperate with the rolling contact body, as is shown in Fig. 5. However, a particularly favorable device is formed if conducting bands placed on edge are arranged side by side so as to form a block similar to a commutator and if the individual resistances are connected to these "commutator bars." It thus is possible to make the commutator pitch considerably smaller than the diameter of the wire so that for example a pitch of 0.5 to 1 millimeter may be used.

In using metal wire (iron wire, Swedish wood carbon iron) care should preferably be taken that the contact surface is not oxidized or its conductivity otherwise affected, for example by placing the adjustable resistance into a hydrogen, nitrogen or similar atmosphere or into a vacuum. By using a resistance with strongly positive temperature coefficient an automatic increase of the resistance of the switched-in portions occurs depending on the heating which also facilitates the reduction of the current.

The resistance per turn may be made larger in the portion of the device which is switched-in after exceeding the current maximum, since within this range the current itself is reduced so that with larger resistance values an arc formation is definitely prevented. A particularly economical size of the resistance is obtained if the resistance is so graduated that the product of resistance per turn and current remains approximately constant over the entire range of the rise and drop of the current or at least over the first part of this range. The resistance must then change inversely to the current.

It is also possible to prevent also with high currents an arcing or sparking on the resistance by the use of a constant resistance, for example, in the form of liquid columns or carborundum rods or the like, so that care must only be taken that flashing-over (puncturing) does not occur.

A particularly simple construction with a rolling or rockerlike contact is obtained if, for example, the rolling element is rolled-off directly along the resistance body. Such a construction, in which four individual resistances are controlled by two rolling elements, is shown in Fig. 6 in plan view and in Fig. 7 in a side view.

The resistance rods 61, 62, 63, 64 may be formed as wires, bands, tubular bodies or cast pieces and carry at their upper end metal caps 72 and 73 which constitute contacts for the normal position of smallest resistance and are provided with a surface adapted to the rolling surface of the rolling element. The rods 62, 63 are fixedly connected to each other, and between rods 61 and 62 on the one hand, and 63 and 64 on the other hand, cradle or rocker-like rolling contacts 65 and 66, respectively, are provided which are pressed against the respective rods by springs such as spring 67 and moved by a force represented by the arrow 68. The metal caps are connected with each other at the upper final position of the contacts where the resistance is zero. Upon the movement of the rockers 65 and 66, the resistances are connected in series and their active length increases continuously.

It may be advisable not to make the resistances per unit length constant but variable in that either the cross-section or the specific resistance is changed. For example, the specific resistance of the parts 69 and 70 shown in Fig. 7 may increase towards the lower end of the resistance rod. If their faces are metal-plated, a non-arcing switching-over will generally be possible.

The resistance material may consist of rheostat wire, cast iron, carbon, graphite, silicium carbide and the like. It may be advisable to make these resistances hollow (in the form of tubes) and to pass cooling media, such as air, water, oil or the like therethrough.

In order to pass without flashing from the caps to the resistance proper, it is advisable to increase the diameter of the ends of the resistance or to let the metal caps extend into the inside of the resistance material. The rockers may be moved either manually, by magnets, by thermal extension of a wire or bimetal strip or similar means. They may also be moved synchronously with the voltage or the current, for example by a cam or crank drive. The latter will be of importance for example when using the resistance for rectifiers or converters.

If the rocker is moved to the insulating bar 71, an interruption occurs between the parts 70 and the rockers 65 and 66 which, in the example shown, results in a fourfold division. If the residual current is made sufficiently small (for example about 1 ampere) and if condensers are provided in parallel to the interruption gaps for obtaining a good voltage control and a slow rising of the returning voltage, the final switching off may also be performed without arcing. If desired, a larger number of resistances may be used in parallel or in series.

With embodiments according to the invention in which the resistance element itself forms the contact bank for the movable control contact, special means may be provided for keeping the current density at the cross points of the contact bank as low as possible. This is based on the knowledge that at such crossing points the transition or crossing resistance does not decrease with the surface but only with the linear dimension of the contact surface. Therefore, it is of importance to provide that the resistance at these places does not become so large that a dangerous voltage drop arises. A simple means for improving the transition of the current consists in making the current-transition or crossing places quite large. This may be obtained for example by providing several movable control contacts which operate in parallel relative to each other. In such a case it may be advisable to control the movements of the individual contact bodies in such a manner that they operate with a slightly shifted phase relative to each other.

Another means for enlarging the surface consists in making the movable control contact elastically deformable. For this purpose the contact may be constructed for example in the form of a metal band 59 which is supported at both ends 58 and is rolled along the contact bank as shown in Fig. 8.

The use of several resistance parts is of advantage also in cases where the inductive component of the load is larger than the ohmic component so that when interrupting the residual current a comparatively high returning voltage occurs which still renders the switching-off difficult in spite of the low current. This disadvantage can be avoided by providing an additional larger resistance part in the circuit and by inserting this additional resistance at the moment when a certain current limit is underpassed. In this manner it is made possible that with the exception of very low currents the ohmic component is always larger over the entire working range of the switch than the inductive component. The returning voltage upon interrupting of the residual current is hereby very small and the switching-off in circuits with essentially inductive load can generally be effected within a quarter-period.

Such an embodiment of the invention is diagrammatically shown in Fig. 9, in which numeral 81 indicates an alternating current generator, 82 the inductive resistances present in the alternating current circuit, for example, the primary winding of an unloaded transformer. 83 is a series resistance the value of which is variable within large limits, for example, an iron-hydrogen resistance, the active ohmic resistance values of which increases considerably with the temperature. 84 indicates an additional larger resistance. The two resistances 83 and 84 are connected in series with each other and parallel to the switching device 85, and they are switched in and out by means of a switch 86 which interrupts the residual current. A switch 87 is provided for bridging the additional resistance 84. During the normal operation and with small currents the switch 87 is opened and the resistance 84 switched-in. If a current is to be interrupted which is small because of the high inductive voltage drop and which therefore is insufficient for causing switch 87 to bridge the resistance 84, the resistance combination 83 and 84 forms a large ohmic component so that the residual current is quickly reduced. If a large current (short-circuit current) is to be switched off, a quick interruption of the current at switch 85 would be difficult if a large parallel resistance were effective. However, the high current energizes coil 88 sufficiently to close switch 87 so that resistance 84 becomes ineffective. The resistance 83 is constructed so as to depend considerably on the temperature so that it has a small ohmic value on opening of the switch 85 at the first moment after the interruption of the current. The condition of a least-possible rise of the returning voltage on switch 85 is hereby fulfilled. The control of switch 87 directly by the current in the branch circuit of the bridging switch 85, that is at a time when this switch is still closed, has the advantage that the switching-in and switching-out of the additional resistance 84 can be performed at a practically currentless and voltageless condition, which permits the use of a very simple switching arrangement. After switch 87 has been actuated, its position is preferably maintained unchanged for the individual interrupting operation then in progress. For this purpose, a delay-action device may be provided at the magnet 88 which prevents a change of the position of the switch 87 during the interrupting operation, that is, beginning with the point of time when the switch 85 releases. Therefore, the effective resistance value at each switching operation depends on the current value which existed in the circuit immediately before the switching-off operation. The additional resistance is constructed as a purely ohmic or, possibly, as a capacitive resistance and is preferably given a value which is six to ten times as large as the upper limit of the adjustable resistance 83.

It may be advisable to operate the switch 87 in such a manner that the switching-in of the resistance 84 is performed slightly after the interruption of the switch 85, that is at a time when the resistance value of the resistance 83 has been increased by the action of the current. Although such operation subjects the switching device to much higher requirements, they may be justified by the graduation of the resistance change obtained by the invention. In circuits which are operated with an alternating current of a certain frequency, it may be of advantage to synchronize the control of the switching device, as described above. In such a case, the switch 85 may be opened and the residual current interrupted by means of the switch 86 always at a time when the alternating current approaches closely its normal zero point, whereby the switching operations are considerably simplified.

The mentioned arrangement has the advantage that the resistances may be switched-in and off practically without current. The control of the switching arrangement may also be synchronized by opening each switching device by means of a relay in a certain phase position relative to the current. The phase position may be so adjusted that the separation of the contacts happens a short time prior to the zero point so that at the moment of the zero point a safe interruption of the current occurs which is not followed by further arcing.

The means mentioned above may be used not only for interrupting alternating current but also for direct current, particularly one with an alternating component. For switching-off a direct current it is important that in the arrangement of Fig. 9 the effective resistance in the branch circuit of the resistances 83, 84 is so small, at least at the beginning, that a possible arc on the switch 85 becomes unstable already at comparatively small lengths of the arc so that it can be extinguished, if necessary, with the aid of conventional quenching means. At the switching-off operation the resistance absorbs the magnetic energy collected in the inductive elements of the circuit and thus facilitates the switching-off. The part-constructions described above and below may also be combined with the arrangements just mentioned. As interrupting devices 85 or 86 switches of any desirable type may be used, such as for example expansion switches, blow-out switches of any known type as well as oil switches and vacuum switches. Even simple knife switches, cut-out breakers or fuses may be used, especially in cases where the interruption is synchronously controlled and the residual current as well as the returning voltage sufficiently suppressed by the means aforementioned. The two interrupting switches 85 and 86 may be combined in such a manner that the energy liberated at switch 85 is used for controlling or actuating switch 86, or for facilitating the extinction in switch 86, for example, by producing a quenching fluid to flow to the switching gap in 86.

The switching resistance 83 is understood to comply with the requirements previously explained and to be constructed according to any of the resistance devices described in this specification. Thus, for instance, the resistance may be of the temperature-responsive type, it may contain a deformable or fluid conductor such as mercury, potassium lye, sodium lye, an easily fusible metal, a doughy mass, or the resistance may contain solid resistance bodies such as small metal balls, carbon or graphite elements, metal wires or pipes, in constructions of the type exemplified by the foregoing figures.

Although in arrangements of the type exemplified by Fig. 9 a parallel connection of the resistances with respect to the main interrupting place is preferable, other ways of arranging the resistances, in particular a series connection, are also applicable.

Fig. 12 serves to elucidate controllable switching resistances according to the invention, in which the switching resistance proper is provided with several series-connected control contacts. The figure shows two rolling contacts 90 which cooperate with two outer main contacts and two inner main contacts 92. The two contacts 92 are connected by the resistance body 91. Conductors interconnect either contact 93 with the remotest contact 92. In the inoperative position illustrated, the current passes from each outer contact 93 through the appertaining control contact 90 to the adjacent contact 92 so that two parallel-connected current paths are established. As soon as the movable contacts 90 start operating, however, the connections between contacts 92 and 93 are interrupted and the resistance 91 is series connected into the circuit. Arrangements of such type have the advantage of reducing the current load on the resistance device and its contacts during the inoperative periods of the device.

A further reduction of the current load of the individual crossing places is obtained if the movable regulating elements (rolling or rockerlike members) of two or more regulating mechanisms are conductively connected directly with each other.

In the arrangement according to Fig. 12, the main contacts (92 and 93 in Fig. 12) are preferably so shaped that their entire contact surface contacts the rolling control member 90 or 110. As a result, a very slight initial movement of the control member suffices to switch-in the resistance bridge, thus further increasing the speed of operation. The elements 90 and 110 may be shaped as circular arcs in order to facilitate their manufacture as well as for operative reasons. The number of cooperating resistance systems may, of course, be greater than two. The resistance bridges may be formed in one piece. However, it is generally preferable to place the bridges adjacent to each other so that the movable control members perform parallel movements, which renders it possible to interconnect them rigidly, similar to the embodiment of Figs. 6 and 7.

Electromagnetic drive means are preferably employed for actuating the control members. If several cooperating resistance bridges are used, it may be advisable to provide several substantially similarly constructed systems, for example four, and to arrange them star-like as shown in Figs. 10 and 11. Of the four electromagnetic systems only the four magnets 472 are shown in the drawing which are connected to each other so as to overlap star-like so that they are excited by a common coil 473.

When using several cooperating elements it may also be advisable to provide that the individual elements operate in synchronism, especially in switching arrangements in which the control current is influenced by the regulating operation itself, since if one element moves slightly fasten than the other the operation of the other elements may be endangered. In some cases a locking device may be provided for the regulating mechanism whereby the latter is released only upon the occurrence of certain operating conditions. In these cases, the regulating mechanism is prepared for the operation as such by the release of the locking device, while the final release is performed in dependence upon the current. With alternating current of very low amperage an exact synchronous release of the regulating or switching operation can thus be performed. Examples of such devices will be described in later paragraphs.

The above-mentioned requirement to prevent the occurrence of appreciable voltages between two adjacent contact points of the resistance bridge when the movable contact member passes over these points, makes it advisable to use resistance constructions which are practically non-inductive, as shown for example by Figs. 6 and 7. This can also be obtained, for example, by constructing the resistance as a band and to fold it meander like. Insulating layers may be inserted between the individual folds.

In order to obtain mechanical movements of switching or regulating elements with extremely short times of a value of one millisecond, comparatively large accelerating forces are required for actuating the masses to be moved. Even if the adjusting paths or distances are short and the masses are as small as possible, considerable accelerations are necessary for obtaining such small switching or regulating times as required according to the invention. The adjusting paths should not be less than a certain limit because electrical disturbances (flashing-over and the like) may occur on the resistance or its regulating mechanism. The movable masses, further, cannot be reduced below a certain limit because a certain mechanical and electrical load capacity and therefore a certain mass of material are necessary to withstand the large accelerating forces and the considerable mechanical and electrical stresses.

These requirements are difficult to comply with if the conventional tripping or actuating means are employed. It is possible to produce sufficient speeds and accelerations by making use of auxiliary power sources which are suddenly released. Aside from spring means of this type, a charged condenser may suddenly be discharged through an actuating or relasing magnet coil, whereby a sudden very strong effect is produced. It has been found, according to the invention, that certain construction of electromagnetic drive means is especially favorable either for the direct actuation of the resistance regulating mechanisms described, for the release of auxiliary driving forces, or for the actuation of bridging switches or residual current interrupters.

The armature of the electromagnet must be dimensioned for this purpose so that it satisfies the contradictory requirements of a large accelerating force and a low mass so that the operating speed reaches an optimum. In the stationary parts of the electromagnet the path of the magnetic flux must have a small magnetic resistance, that is, a sufficiently large cross section and a short length of the iron path. However, a sufficient number of ampere turns must be provided and every dissipation or leakage must be avoided as much as possible.

An embodiment of this feature of the invention is shown in Fig. 13, in which 161 indicates the iron body of the magnet, the exciting coil 162 of which is energized by the main current. The iron body is interrupted by a cutout 163 and bridged at this place by an armature 164 which is hinged to the body. This armature 164 cooperates with a further iron body 165 which is divided by an air gap 167. The main current also flows through the exciting coil 168 of this body. The armature 164 is connected with a rolling or rockerlike body 170 by means of a lever 169, and this element 170 again cooperates with a contact bank 171 which may be formed by the individual wires of a resistance or a resistance rod or the like. 172 and 173 indicate the two main contacts, while the rolling element is also connected with the contact 173 through a flexible conductor 174. The rolling element carries an armature 175 which is subjected to the attractive force of a magnet 176 whereby the pressure of the rolling element upon the contacts is increased. This magnet also may be excited by the main current so that the following current flow is obtained: winding 168, winding 162, winding of the magnet 176, contact 172, possibly resistance bridge 171, rolling element 170, flexible conductor 174, and main contact 173.

The magnet 165 acts upon the armature as a support in such a manner that it holds the same during normal operation. However, upon exceeding a certain over-current value at which the holding force is overcome by the attractive force of the magnetic body 161, and as soon as the armature moves, the attractive force of the system upon the armature 164 becomes after a short movement negligibly small so that a very quick armature movement is obtained. Since the magnet body 165 possesses a place of small cross section 166 which acts so to speak as a magnetic isthmus, the influence of the magnetic system 165 increases considerably less at a current rise than the attractive force of the magnet 161, so that at a current value which may be very exactly adjusted, the armature 164 is released. The tripping value of the current may be adjusted on the one hand by the ratio of the number of turns of the windings 162 and 164, and on the other hand by the adjustment of the magnetic cross section at the point 166, and finally also by the adjustment of the air gap 167. Furthermore, the cross sections of the iron and the saturation conditions in the iron bodies 161 and 165 may be adjusted in accordance with the requirements of each individual case. The supporting magnetic system 165 may be divided into two magnet bodies in order to keep the tractive holding force upon the armature 164 very low by the magnetic subdivision of the voltage or flux. This is advisable particularly if fractional ampere turn numbers would become necessary or if the number of turns of the windings are so small that the winding 168 would require a number of turns smaller than one. An electrical subdivision of current by means of a shunt in place of such a magnetic subdivision may be employed.

The magnet for performing the pressure may also be combined with the magnet body for the magnetic support.

The application of the inventive features described in connection with Fig. 13 is not limited to the example illustrated. The pressure of the rolling contact against the contact bridge may also be produced by the effect of the mass of the contact bridge or by spring pressure. The tractive force of the magnet 165 may also be utilized for supplying such pressure. For this purpose, an outer support for the rolling element would be required at the side opposite the contact bridge. In place of a rolling element a slide or other resistance control element may be applied, as stated above.

Aside from the use of such a magnet system in switching or regulating arrangements of the above-described type, the magnet system is also advantageous for other relays and similar constructions, since it allows producing a comparatively large lifting movement within such short times as previously not obtainable. The application of the opposed magnet as magnetic support has considerable potential advantages in other fields of application where it is desired that a strong opposed force becomes practically ineffective very quickly after it has been overcome by the main force.

Any of the above-mentioned means may be connected with the arrangement of Fig. 13 for interrupting the residual current. A simple arrangement for the synchronous control of such an interrupting device is formed, according to Fig. 25, as follows. The magnet system 161 is interrupted at a suitable place, for example, opposite the cut-out 163, by an air gap which is bridged by a further movable armature 410. This armature is affected by a strong source of power such as spring 411 and provided with a locking device 412 which is released for example by a movement of the armature 164. A slide bar 413 and a lever 414 serve as transmission between armature 164 and locking device 412. Upon passing below a certain strength of flux (amperage), the armature 164 is pulled off a short time interval prior to the zero point, and therefore is especially adapted for actuating or releasing a residual current switch with the advantage of a synchronous interruption.

In the electromagnetic control, and generally in the transmission of proceedings in alternating current circuits, it is in many cases a disadvantage that at a certain current the flux reaches practically its saturation limit so that the desired current dependency of the flux is no longer present or very distorted, whereby the operation may become faulty. It may also occur that the time which passes until the flux changes from its positive saturation value to the corresponding negative value, is so short that it is difficult to utilize the quickly changing flux values existing during this period, for control purposes.

According to the invention, these disadvantages are avoided by splitting off from the main flux a partial flux which is forced by suitable means to assume a rate of change which differs from that of the main flux and is regulatable within wide limits. With these means, in spite of the sudden changes of the main flux which because of the saturation proceed with very great speed, a considerably slower change of the partial flux is obtained. The variation of the partial flux thus follows a curve which departs essentially from the rectangular curve of the main flux and which by virtue of the comparatively slow change is much better suited for the production or utilization of its intermediate values for control purposes. The invention is of special advantage in arrangements which operate with a holding armature which upon the passing of the current below a certain value is pulled off by an opposing force. It may happen in these mechanisms that at the zero point the armature is not pulled off at all because of the exceedingly quick change of the flux from a high positive to a high negative value. However, if according to the invention the holding armature is placed in the iron path of the split-off partial flux, the change of the partial flux is so slow that the armature can be pulled off safely and at an exactly determinable moment even with very high currents and a strongly saturated main flux path. For properly starting the change of the partial flux it is even advisable to design the magnet system so that in the main flux path the saturation limit is exceeded already at low current values, and that the change of direction of the main flux proceeds as quickly as possible. By suitably dimensioning of the partial flux on the one hand and of the opposed force on the other hand, it is also possible to insure that the armature is pulled off with great accuracy at predetermined values of the current which may either have a certain final magnitude or be practically equal to zero.

For the use in relay and tripping devices designed to effect tripping upon the occurrence of an overload and at a fixed moment relative to the cycle of the alternating current, the arrangement is preferably combined with an additional locking device for the armature which is released only at certain excess current values. It thus is possible that the relay is tripped continually, that is, practically at each zero point or in each half-period. However, it depends on the current changes actually occurring in the half-period whether or not the latch is released and the tripping becomes effective. Such control device may also be started to operate at a zero point preceding the actual overloading, and be made effective at the next zero point following the overloading. The release of the armature may also be controlled in dependence upon the magnitude of the direct current component possibly occurring at a short circuit. This may be done in such a manner that the interruption occurs at the next zero passage of the current if the direct current component remains below a given magnitude, but in other cases not before the next following zero point (that is, at that moment when the current would have passed through zero if no short circuit had occurred).

The mentioned splitting-off of a partial flux is also advantageous in cases where a tripping shall be executed with great accuracy immediately at the moment of the short circuit. In such cases an oscillatory armature is preferably employed.

Another way of biasing the magnetic flux so as to obtain the desired rate of change, is to influence the exciting current itself by suitable resistances. This form of the invention also allows a construction wherein a locking device is released practically at the moment of the occurrence of a short circuit or disturbance and acts upon a tripping mechanism which has been set into operative condition already at the preceding zero point so that an especially quick tripping is effected. The time beginning with the starting of the tripping device or the release of the locking device may be made equal to the time of a chosen integer multiple of the duration of a cycle. Furthermore, it is possible to combine herewith a supervision in such a manner that a release occurs only if the disturbance continues at least for a certain portion of the intermediate time.

In order to increase the operating speed as much as possible, the movable armature may be arranged according to the invention within the part of the iron path which is enclosed by the exciting coil. For the same purpose the armature may be constructed as a wedge-like body and arranged within a likewise wedge-like air gap in such a manner that a shifting of the wedge-like armature occurs. Both means, especially if in combination, reduce the leakage and, at a suitable number of ampere turns, obtain an especially favorable utilization of the flux change for the acceleration of the armature, whereby the operating speed is considerably increased. An example of such type will be described later in connection with Fig. 14.

A further improvement in this regard may be obtained by making the cross section of the iron path which lies outside of the coil larger, for example, twice as large, than within the coil body. The number of ampere turns necessary for obtaining a certain flux may thus be considerably reduced so that a further increase of the operating speed is obtained. Such an enlargement of the iron cross section may be obtained for example by providing the iron body with a multiple iron yoke. The two yoke paths may lie for example similarly as in a shell type transformer, that is, symmetrically relative to the coil body in one plane or inclined to each other, for instance, similar to the construction of Figs. 10 and 11.

It is advisable to make the iron bodies of the magnetic systems according to the invention, of highly permeable and highly efficient material of best available quality. Contrary to usual constructions, however, only the magnet body proper need be laminated while the movable armature may be made from a solid piece. The bolts, screws or other connecting elements for the individual laminations or segments on the armature are thus avoided and the existing cross section may be better utilized. At the same time the asymmetry of the flux distribution is avoided which would be caused by such connecting elements. It is thus possible to make the armature itself very small and to obtain a higher utilization of energy and also an increase of speed which outweigh the small disadvantage of a slightly increased loss of heat. The armature should be kept as small as possible in order to reduce the acceleration required for producing the desired speed. A lower limit is hereby given practically by the operating voltage which demands a resistance body or contact surfaces of a certain minimum size which in turn determines the minimum lifting movement. An especially suitable arrangement is formed if the largest dimension of the magnet core lies in the direction of the pivoting axis of the movable armature, while the two other axes which are vertical with respect to the first mentioned axis have the least possible dimension. By enlarging the arrangement in the direction of the pivoting axis, the pole surfaces which are necessary for the force required can be enlarged without impairing the acceleration. From the last-mentioned point of view, a solid, i. e., unlaminated, armature may be advantageous also because in a laminated armature the length of the securing elements and the width of the armature are limited in consideration of the occurring high forces. When using such an armature of large width it is also advisable to arrange several rockers mechanically in parallel and adjacent to each other, similar to some of the aforedescribed arrangements, for instance that of Figs. 6 and 7. The electrical connection may either be in parallel or in series or a mixed connection, depending on the current or the voltage.

In order to increase the acceleration, the mass of the rolling bodies should also be very small. The rolling body is preferably constructed of welded sheet steel, a rubber layer is placed upon the rolling surface and a contact surface of silver or silver-plated sheet copper may be vulcanized thereon.

Some examples may illustrate the above-explained modifications.

Fig. 14 shows a magnetic system in connection with the movable control member of the variable resistance to be actuated by the armature of the magnet. The magnet body 201 has a wedge-shaped air gap 203, one surface of which is curved cylindrically. The exciting coil 202 which, for example, is traversed by the main current to be switched or regulated, surrounds the gap. The armature 204 is also wedge-shaped and has a cylindrical surface facing the cylindrical surface of the gap. A lever 241 pivotally connects the armature 204 with the magnet body, the fulcrum coinciding with the axis of the cylindrical curvature. The other limiting surfaces 232 of the iron body and 242 of the armature are so formed that in the outermost lower end position of the pivotal movement they fit upon each other, and if desirable, a thin non-magnetic layer may be interposed to prevent them from adhering to each other. The air gap is therefore continuously reduced from the largest to the smallest distance by the pivotal movement of the armature in the downward direction. The lever 241 which may consist for example of non-magnetic material, has an extension 243 which is coupled with the rolling member 210 to be actuated. Such lever and extension may be arranged at both sides of the armature and control member.

If the control member of the variable resistance is provided with a spring or the like for maintaining a certain contact pressure, the spring can be arranged in such a manner that the movement of the armature is not impeded by this spring. This is obtained, for example, by placing the suspension points of the spring in such a position that at the rolling-off of the control member the point of connection between the spring and the member moves substantially along a cyclic arc about the other point of suspension of the spring.

Although most of the embodiments above described have been elucidated mainly in view of their application for interrupting or regulating heavy currents, it is evident that the individual arrangements, part-constructions and elements here referred to are also favorable in connection with relays, protective devices, or control apparatus for other purposes which require, or make desirable, an operative speed, an acceleration or a quick regulation through several orders of magnitude of the value to be controlled, as explained in the first sections of this specification. Remote control systems, selective protective systems, and the control of mutually dependent apparatus, for instance, may be improved by employing the methods and means of the invention if operating conditions similar to those here dealt with are present.

Although switching means for interrupting the residual current, such means being necessary if a complete interruption of the circuit is required, have already been described, in particular in connection with Figs. 3 and 9 showing such switching devices, some modifications and improvements, especially as regards the coordination and cooperation of these switches with the other elements of arrangements according to the invention, remain to be discussed.

To begin with, it is not always necessary to employ separate switching means for this purpose. The ohmic value of the control resistances themselves may be so graduated that the effective resistance increases up to a magnitude where the current practically disappears. The circuit can then be opened without danger, for example, with a normal disconnecting switch or the resistance may hold the small residual current until this current is interrupted automatically by any other slow switch present in the circuit.

In arrangements according to the invention, the interrupter for the residual current and the control mechanism of the resistance may depend upon each other by unilateral or mutual locking so that the residual current switch, for example, cannot be opened before the resistance has become effective or has reached its position of highest resistance or so that the resistance cannot be operated while the residual current switch is closed.

The control mechanism of the resistance may also be locked in its position of greatest resistance by means of a latch, or the mechanism may be combined with a switching device (disconnecting switch) which opens quickly immediately after reaching this position. This is advisable particularly for regulating devices with rolling control elements which return automatically to their starting position when the current decreases.

The above-mentioned possibilities of rendering the interrupter for the residual current and the operation of the controllable resistance interdependent, will be better understood from the following description of the embodiments shown in Figs. 15 and 16.

In Fig. 15, 301 indicates a container enclosing a magnet 302 with an exciting coil 303. The armature 304 of this magnet actuates, by means of a lever 305, directly the rockers 306 for controlling two resistance devices 307. These rockers operate in series and parallel according to Fig. 12. The iron path of the magnetic system 302 is interrupted by an air gap 308 which is bridged by a second armature 309. An insulating rod 310, which is acted upon by a spring 311, connects the armature 309 with the switching pin 312 of a breaker for interrupting the residual current. As soon as the flux in the magnetic system 302 has passed below a certain value so that the force of spring 311 exceeds the magnetic pull upon armature 309, the switching pin 312 is pulled out of the counter-contact 313 and opens the circuit. The container 301 may be filled with a medium which favorably affects the current interruption, such as for example, an insulating fluid or an insulating gas, especially under pressure, whereby the interruption of the residual current is further facilitated.

The container 301 itself may be conductively connected into the circuit and then preferably be mounted on an insulating support 327.

The arrangement contains an additional device for effecting an interruption at will by hand or remote control. This device comprises an insulated member 326 connected with a piston 323 of a pneumatic drive. A return spring 325 is arranged in the cylinder 324 of the piston. The air pressure is applied through conduit 350. Means for the manual actuation of the device are indicated at 322 by dotted lines.

The embodiment illustrated in Fig. 17 is constructed as follows:

Two resistance bridges 501 are provided whose individual resistance conductors 502 consist of tubular elements and are supplied with a cooling fluid. The control member 550 of each resistance bridge consists of a steel band or sheet structure of relatively little weight and is covered with a metallized rubber layer 551 or the like. The control mechanism is otherwise similar to that of Fig. 13 and the end contacts of the resistances are connected in accordance with Fig. 12 so as to effect a change-over from a parallel connection to a series connection.

The operating magnet system has a magnetic shunt 157 and a short-circuit coil 153 besides the main energizing coil 152. The armature 204 is wedge-shaped and arranged in a wedge-shaped air gap in order to obtain favorable flux conditions. The armature is subjected to the holding force of a magnet 165 whose coil 166 is series connected with the main energizing coil 152. An extension 243 of the armature 204 is coupled with both control members 550, an intermediate coupling or transmission member being provided to connect both control members.

The arrangement contains a further actuating device for manual operation or remote control, which is similar to that of Fig. 15 and therefore designated by the same numerals 323 to 326. It will be seen that if the latter device is operated, the resistances 501 become effective and reduce the current intensity before the switch contact finally interrupts the circuit.

Particularly at a strongly varying load, the interrupting operation should be preceded by a regulating operation which reduces the current. In such cases, therefore, the use of devices 323 to 326 is preferable.

In an arrangement according to the invention, wherein the control member is arrested by a mechanical or electromagnetic latch and released not until a certain minimum current is reached, this latch may be made arbitrarily releasable in order to allow a manual or remote control operation.

The point of time of the automatic reclosing operation may be exactly determined by an additional latching of the arrangement. The final reclosing may be released dependent upon other electrical magnitudes, for example, such magnitudes in other parts of the circuit. This is of importance particularly for selective protecting devices. Such a latching device may be constructed in such a manner that an arbitrary reclosing is prevented until certain electrical conditions or switching positions have been restored.

The length of time of the regulating operation which precedes the interrupting operation is preferably such that the excess voltage on the resistance remains constant during this period. Thus the electrical stress of the resistance remains small so that even with uneconomical regulating devices the current may be reduced to a very low value, whereby a very low stress on the interrupter for the switching device is obtained.

For facilitating the switching operation a capacity may be connected in parallel with the residual current switch, the resistance or both.

If the residual current switch is constructed as an air disconnecting switch or connected with such a switch in series, the disconnecting switch may be constructively combined with the arrangement in the manner indicated in Fig. 16. The supporting insulator 327 supporting the arrangement also carries the movable contact 328 of the disconnecting switch, the fixed contact 329 of which is arranged on a second supporting insulator 330.

Special advantages are obtained if the resistances and their regulating device, possibly also the residual current switch, are combined into a unitary structure which is designed for a certain normal current and voltage. If desirable, several units may be connected in parallel for the interruption of larger currents, or in series for use with higher voltages. An entire group of units 301, 301' and 301" may for example be arranged on a common supporting insulator 327, as indicated in the embodiment according to Fig. 16. Such a combination of smaller units is not possible with switches of the usual type; only the devices according to the invention permit such a combination because the switched-in resistances facilitate the correct distribution of the current and the voltage upon the units which are combined into one group.

The above-described features of the invention may be combined with one another in many different ways. As shown in the foregoing, many of the constructive details described may be used in different fields of application, and different constructions of the switching or regulating devices may be used side by side in one and the same arrangement. The individual sections of a step by step resistance may also be of different types, for example, one section may be a fluid or deformable resistance according to Figs. 5, 6 while the other section may be provided with a rolling or rockerlike element according to Fig. 8. Various other features of the embodiments described may also be combined with one another in a suitable manner.

What is claimed is:

1. An apparatus for controlling electric currents, in particular in high power circuits, comprising the combination of resistance means capable of varying the effective resistance value within extreme limits and connected with the circuit to be controlled, said resistance means comprising a line of contact points; a movable control member of rocker shape arranged to roll off along said line of contact points in order to vary the effective resistance value, and means for actuating said control member with a speed not less than in the same order of magnitude as that of the current changes occurring in said circuit, whereby said resistance means are caused, when in operation, to start increasing their resistance value at a low current intensity and to assume a resistance value sufficient for the control purpose within a period not longer than that within which the current would otherwise reach its next maximum intensity.

2. In an apparatus as set forth in claim 1, said line of contact points consisting of a commutator-like contact bank.

3. An apparatus for controlling electric currents, in particular in high power circuits, comprising an elongated resistance body capable of varying the effective resistance value within extreme limits and connected with the circuit to be controlled, said body forming a series of tap contacts, a movable control member of rocker shape arranged to roll off along said series of contacts in order to vary the effective resistance value, and means for actuating said control member with a speed not less than in the same order of magnitude as that of the current changes occurring in said circuit, whereby said resistance means are caused, when in operation, to start increasing their resistance value at a low current intensity and to assume a resistance value sufficient for the control purpose within a period not longer than that within which the current would otherwise reach its next maximum intensity.

4. An apparatus as set forth in claim 3, characterized in that said resistance body has a number of sections and that said series of contacts is formed directly by said individual sections.

5. An apparatus as set forth in claim 1, having an electromagnet for pressing said control member against said contact points, and means for energizing said magnet in dependence upon the current to be controlled.

6. In an apparatus as set forth in claim 1, at least one of said control members and said line of contact points being elastically deformable.

7. In an apparatus as set forth in claim 1, said rolling control member being formed as a sheet metal body of small mass.

8. In an apparatus as set forth in claim 1, said control member having its rolling surface provided with a flexible layer, said layer having a metallic contact surface.

9. In an apparatus as set forth in claim 1, a spring for holding said control member in engagement with said line of contact points, said spring having its point of attack on said member arranged to move approximately along a circular arc about the opposite end of the spring so as to perform practically no work during the control movement of said member.

10. An apparatus as set forth in claim 1, having two or more control members designed to operate synchronously and in a given phase position relative to one another.

11. In an arrangement for controlling electric high power circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, means for actuating said control means so as to cause, when in operation, said resistance means to start increasing its resistance value at a low current intensity and to assume a resistance value sufficient to reduce the current intensity substantially below that otherwise obtained at the next current maximum, an additional resistor series connected with said resistance means, a contact device for bridging said additional resistor, and current-responsive means for actuating said contact device.

12. In an arrangement for controlling electric high power circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, means for actuating said control means so as to cause, when in operation, said resistance means to start increasing its resistance value at a low current intensity and to assume a resistance value sufficient to reduce the current intensity substantially below that otherwise obtained at the next current maximum, an additional resistor series connected with said resistance means, a contact device for bridging said additional resistor, and drive means for actuating said device so as to bridge said resistor previous to the operation of said resistance means.

13. In an apparatus as set forth in claim 12, said drive means being responsive to a current leading the current of the circuit to be controlled.

14. An apparatus as set forth in claim 12, characterized by means for utilizing the energy liberated when switching in said resistance means for controlling said device.

15. In an apparatus for controlling high power circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient to reduce the current intensity substantially below that otherwise obtained, said actuating means comprising a magnet body having a wedge-shaped air gap, a wedge-shaped armature arranged in said gap and movable about a fulcrum outside of said gap, the iron path outside the armature being as short as possible but having an increased iron cross section.

16. An apparatus as set forth in claim 15, characterized in that the iron core has its largest dimension in the direction of the axis of rotation of the armature.

17. An apparatus as set forth in claim 15, characterized in that the magnet body forms a multiple return path to the armature.

18. In an apparatus for controlling high power circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient to reduce the current intensity substantially below that otherwise obtained, said actuating means comprising an electromagnet body, an alternating current winding on said body, and an armature, said body forming a magnetic shunt path designed for carrying a split-off portion of the total flux, said armature being arranged so as to be actuated by said split-off flux portion.

19. In an apparatus for controlling alternating current circuits, in particular high power circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient to reduce the current intensity substantially below that otherwise obtained, said actuating means comprising a magnet body, an alternating current winding for energizing said body, an armature to be actuated by said magnet body, and means for phase displacing the actuation of said armature with respect to the alternating current energizing said winding.

20. In an apparatus as set forth in claim 19, said phase displacing means being designed for actuating said armature at a predetermined point of the cycle before the current passes its zero value.

21. In an apparatus for controlling alternating current circuits, in particular high power circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient to reduce the current intensity substantially below that otherwise obtained, said actuating means comprising a main electromagnet having an armature mechanically connected with said control means, and a retaining magnet also acting on said armature so as to oppose the action of said first magnet with a limited force.

22. In an apparatus as set forth in claim 21, said main magnet and said retaining magnet having each an energizing coil connected with the circuit of said resistance means so as to be energized in accordance with the current to be controlled.

23. An apparatus as set forth in claim 21, said retaining magnet having an iron core provided with a magnetic isthmus and a magnetic shunt interlinked therewith by the insertion of an air gap, the flux of the magnetic shunt acting on said armature.

24. In an arrangement for interrupting, regulating or otherwise controlling electric circuits, in particular high power circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient for the control purpose within a period not longer than that within which the current would otherwise reach its next maximum intensity, said resistance means comprising several units in an electric arrangement forming a parallel connection in the position of the smallest resistance and a series connection in the other positions of the control members of said units.

25. In an arrangement for interrupting, regulating or otherwise controlling electric circuits, in particular high power circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient for the control purpose within a period not longer than that within which the current would otherwise reach its next maximum intensity, said actuating means consisting of a quick-acting electromagnet.

26. In an arrangement for interrupting, regulating or otherwise controlling electric circuits, in particular high power circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient for the control purpose within a period not longer than that within which the current would otherwise reach its next maximum intensity, said actuating means comprising a magnet, an exciting coil, and an armature arranged in the portion of the iron path of said magnet which is enclosed by said exciting winding.

27. In an arrangement for interrupting, regulating or otherwise controlling electric circuits, in particular high power circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient for the control purpose within a period not longer than that within which the current would otherwise reach its next maximum intensity, said actuating means comprising a magnet having a wedge-shaped air gap and an armature also designed in the form of a wedge and arranged in said wedge-shaped air gap.

28. In an arrangement for interrupting, regulating or otherwise controlling electric circuits, in particular high power circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient for the control purpose within a period not longer than that within which the current would otherwise reach its next maximum intensity, said actuating means comprising a magnet having a wedge-shaped air gap and a rotatable wedge-shaped armature in said gap, one side of said armature and the adjacent wall of said gap having coaxial cylinder surfaces whose axis coincides with the axis of rotation of said armature.

29. In an arrangement for interrupting, regulating or otherwise controlling electric circuits, in particular high power circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient for the control purpose within a period not longer than that within which the current would otherwise reach its next maximum intensity, said actuating means having a laminated magnet body and an armature consisting of solid iron.

30. In an arrangement for interrupting, regulating or otherwise controlling electric circuits, in particular high power circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient for the control purpose within a period not longer than that within which the current would otherwise reach its next maximum intensity, said actuating means comprising an electromagnet having an armature operatively connected with said control means, and releasable means for retarding the initiation of the armature movement in order to increase the acceleration of said movement.

31. In an arrangement for interrupting, regulating or otherwise controlling electric circuits, in particular high power circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient for the control purpose within a period not longer than that within which the current would otherwise reach its next maximum intensity, said resistance means comprising a stepped resistor having the voltage drop between its adjacent steps so rated as to be below the voltage at which an arc can exist under the given external conditions.

32. In an arrangement for controlling electric high power circuits, in particular alternating current circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, means for actuating said control means so as to cause, when in operation, said resistance means to start increasing its resistance value at a low current intensity and to assume a resistance value sufficient to reduce the next current maximum considerably below that otherwise occurring, and means provided with an automatic reclosing device for interrupting the residual current.

33. In an arrangement for controlling electric high power circuits, in particular alternating current circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, means for actuating said control means so as to cause, when in operation, said resistance means to start increasing its resistance value at a low current intensity and to assume a resistance value sufficient to reduce the next current maximum considerably below that otherwise occurring, and means for interrupting the residual current, said resistance means, said control means, said actuating means and said interrupting means being enclosed within a common container, an insulating structure supporting said container, a disconnecting switch having two coacting contacts arranged in circuit with said interrupting means, one of said contacts being also disposed on said insulating structure, and a second insulator carrying said second contact of said disconnecting switch.

34. A current-converting system having periodically operating circuit interrupters comprising the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient for the control purpose within a period not longer than that within which the current would otherwise reach its next maximum intensity.

35. A current-converting system having circuit interrupters operating with overlapping closure periods and forming temporary short-circuits during the commutation periods, said circuit interrupters comprising the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient for the control purpose within a period not longer than that within which the current would otherwise reach its next maximum intensity.

36. A current-converting system having periodically operating circuit interrupters and adjusting means for controlling the converting operation of said interrupters in combination with resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient for the control purpose within a period not longer than that within which the current would otherwise reach its next maximum intensity.

37. In an arrangement for interrupting, regulating or otherwise controlling electric circuits, in particular high power circuits, the combination of resistance means capable of varying the effective resistance value within extreme limits and connected with the circuit to be controlled, control means operatively associated with said resistance means for varying the effective value of said resistance means with a speed not less than in the same order of magnitude as that of the current changes occurring in said circuit, and means for actuating said control means so as to cause, when in operation, said resistance means to start increasing its resistance value at a low current intensity and to assume a resistance value sufficient for the control purpose within a period not longer than that within which the current would otherwise reach its next maximum intensity, said actuating means comprising a magnet having a wedge-shaped air gap, and a wedge-shaped armature arranged in said gap and rotatable about an axis outside of said gap.

FRITZ KESSELRING.
ROBERT SCHIMPF.
WERNER KAUFMANN.
HERMANN NEUGEBAUER.
WILHELM PUTTFARCKEN.
FRIEDRICH GIEFFERS.
MARCEL ZÜHLKE.